United States Patent [19]

Peacock

[11] Patent Number: 5,502,112

[45] Date of Patent: * Mar. 26, 1996

[54] THERMOPLASTIC OLEFINS

[75] Inventor: Andrew J. Peacock, Houston, Tex.

[73] Assignee: Exxon Chemical Patents Inc., Wilmington, Del.

[ * ] Notice: The portion of the term of this patent subsequent to Feb. 22, 2094, has been disclaimed.

[21] Appl. No.: 348,016

[22] Filed: Dec. 1, 1994

Related U.S. Application Data

[63] Continuation-in-part of Ser. No. 210,101, Mar. 18, 1994, abandoned, which is a continuation of Ser. No. 922,216, Jul. 30, 1992, abandoned.

[51] Int. Cl.$^6$ ............................ C08L 23/06; C08L 23/16
[52] U.S. Cl. .................... 525/240; 525/197; 524/528
[58] Field of Search ............................... 525/240

[56] References Cited

U.S. PATENT DOCUMENTS

| | | | |
|---|---|---|---|
| 3,517,086 | 6/1970 | Shirayama | 260/897 |
| 4,251,646 | 2/1988 | Smith, Jr. | 525/240 |
| 4,319,004 | 3/1982 | Spielau et al. | 525/240 |
| 4,319,005 | 3/1982 | Spielau et al. | 525/240 |
| 4,336,351 | 6/1992 | Cinadr | 525/240 |
| 4,412,016 | 10/1983 | Fukui et al. | |
| 4,426,498 | 1/1984 | Inoue et al. | 525/240 |
| 4,473,687 | 9/1984 | Dorrer et al. | 525/240 |
| 4,536,549 | 8/1985 | Hattori et al. | 525/240 |
| 4,621,119 | 11/1986 | Lu | 525/240 |
| 4,622,193 | 11/1986 | Kresge et al. | 264/141 |
| 4,643,735 | 1/1987 | Thiersault et al. | 525/240 |
| 4,692,496 | 9/1987 | Bahl et al. | 252/240 |
| 4,722,973 | 2/1988 | Yamaoka et al. | 525/240 |
| 4,748,206 | 5/1988 | Nogiwa | 525/240 |
| 4,822,855 | 4/1989 | Kobayashi et al. | 525/240 |
| 5,288,806 | 2/1994 | Peacock. | |

*Primary Examiner*—Carman J. Seccuro, Jr.
*Attorney, Agent, or Firm*—M. S. Spiering; F. E. Reid

[57] ABSTRACT

This invention relates to a ternary blend of 25 to 45 wt. % random polypropylene copolymer, 20 to 40 wt. % ethylene propylene rubber and 30 to 45 wt. % high density polyethylene having excellent low temperature impact resistance and useful for producing molded articles.

17 Claims, 2 Drawing Sheets

THERMOPLASTIC OLEFINS

CROSS REFERENCE TO RELATED APPLICATIONS

This is a Continuation-In-Part of U.S. Ser. No. 08/210,101 filed Mar. 18, 1994 now abandoned which is a continuation of U.S. Ser. No. 07/922,216 filed Jul. 30, 1992 now abandoned.

FIELD OF THE INVENTION

This invention relates to thermoplastic olefins which display quasi-single phase behavior. In particular, this invention relates to thermoplastic olefins comprising a blend of propylene based random copolymer, ethylene propylene rubber and polyethylene.

BACKGROUND OF THE INVENTION

Polypropylene exhibits several advantageous properties, for example, relatively low density, excellent resistance to higher temperatures and aqueous and non-aqueous liquids. Polypropylene also has the less favorable characteristic of inadequate impact strength at temperatures below room temperature especially below 0° C. Adequate impact strength, however, is required and is of importance in many uses such as for example freight containers, suitcases, automobile parts and similar parts. Articles made of high density polyethylene possess this satisfactorily high impact strength but show a lower resistance to deformation at high temperatures. Ethylene propylene elastomers, saturated as well as unsaturated, exhibit good mechanical properties such as high heat aging resistance, high ozone resistance and impact resistance at low temperatures, such that the copolymers are also excellently suited for use where the product is exposed to weathering. Due to the elastomeric properties of these copolymers, it is popular to combine elastomers with harder polymers. Many attempts have been made to combine the properties of polypropylene and/or polyethylene and/or ethylene propylene rubbers by the production of binary or ternary blends or molding compositions. Mixtures of polypropylene and polyethylene are known, however, these mixtures exhibit an impact strength at room temperature which is hardly improved over polypropylene itself. Also, blends of isotactic polypropylene and ethylene propylene elastomers, which are cross-linked or partially cross-linked by vulcanizing agents, require improvement with respect to tensile strength, modulus, and hardness values attainable.

Blends of polyethylene with EPDM terpolymers of ethylene, propylene and nonconjugated diene are known from U.S. Pat. No. 3,919,358 and exhibit high tear strengths. The blends do not show sufficient heat resistance due to the low melting temperature polyethylene. Ternary molding compositions are also described in British patent No. 1,154,447. These crystalline polypropylene, polyethylene and ethylene propylene block copolymer ternary blends exhibit a tensile strength of only 10 N/mm$^2$ and are not flexible at temperatures below 30° C.

Various polyolefin ternary blends have still been used in many industrial applications because of the balance achieved among several properties, for example, between rigidity and impact resistance. In particular, ternary blends known as thermoplastic elastomers (TPE's) are used where rigidity and impact resistance are important. A thermoplastic olefin (TPO) is a subset of TPE's. Typically a TPO is a blended product of a hard segment of semi-crystalline polypropylene or semi-crystalline polyethylene and a soft segment of an olefin elastomer such as ethylene propylene rubber (ER), ethylene/propylene/diene terpolymer (EPDM), polyisobutylene or polybutadiene. The TPO may also be subject to partial cross-linking in order to improve physical properties. In recent years however, the required merits of the blend such as good moldability, appearance of the molded articles i.e. high gloss, paintability, thermal resistance, low temperature impact resistance and the property that the deformation caused by impact is easily restored have become more important. The conventional TPE's and TPO's have not always met these requirements.

U.S. Pat. No. 4,748,206 to Nogiwa discloses quaternary blends of polypropylene, ethylene propylene rubber, ULDPE and LLDPE or MDPE and addresses some of these issues. (ULDPE=ultra low density polyethylene, LLDPE= linear low density polyethylene and MDPE=medium density polyethylene) However, the inclusion of 5 to 30 wt. % MDPE and 5 to 50 wt. % ULDPE is limiting. Spielau et al. in U.S. Pat. Nos. 4,319,004 and 4,319,005 disclose ternary blends of 38 to 48 wt. % non-amorphous ethylene propylene copolymer (at least 65 wt. % ethylene), polyethylene, preferably high density polyethylene (HDPE) and 3 to 30 wt. % non-amorphous propylene homopolymer or (polypropylene copolymer up to 12 wt. % ethylene).

Further U.S. Pat. No. 4,822,855 to Kobayashi discloses a blend of 30 to 70 parts polyethylene, 30 to 70 parts of random propylene copolymer of up to 12 wt. % ethylene and 70 to 200 parts ethylene propylene rubber. Kobayashi, however, uses very low density polyethylene with a density between 0.86 to 0.91 g/cm$^3$.

There still exists a need in the an to develop a rubber toughened thermoplastic olefin for use in molded applications that has high stiffness and does not exhibit low temperature brittleness.

SUMMARY OF THE INVENTION

This invention relates to a composition comprising a random copolymer of propylene, ethylene/α-olefin elastomer and polyethylene. In one instance this invention, further relates to a blend of propylene based random copolymer (RCP) containing up to 20 weight percent α-olefin, particularly ethylene, high density polyethylene (HDPE) and ethylene/α-olefin rubber (ER). The random copolymer is present in the blend from 25 to 45 weight percent, the ER is present from 20 to 40 weight percent, and the HDPE is present from 30 to 45 weight percent. The high density polyethylene used in this invention has a density in the range of 0.94 g/cm$^3$ and above. An HDPE with a melt index (MI) of around 5 can also be used in this invention.

The compositions of this invention can be formed into molded articles. Examples include, but are not limited to: automobile bodyparts, bumpers, facia, interior trim, exterior trim, weather trim, hoses, exterior parts, wheel arches, air dams, trash cans, storage containers and the like.

Such products are widely used in automobiles where flexibility, resilience and toughness is required. Principal applications are in injection molded exterior body pans including bumpers, wheel arches and air dams. The principal requirements for these materials as defined by the automotive sectors are high impact strength at subambient temperatures, medium flexural modulus, low embrittlement temperature, high softening temperature, resiliency, good surface finish and good paintability.

DETAILED DESCRIPTION OF THE INVENTION

Figure 1:
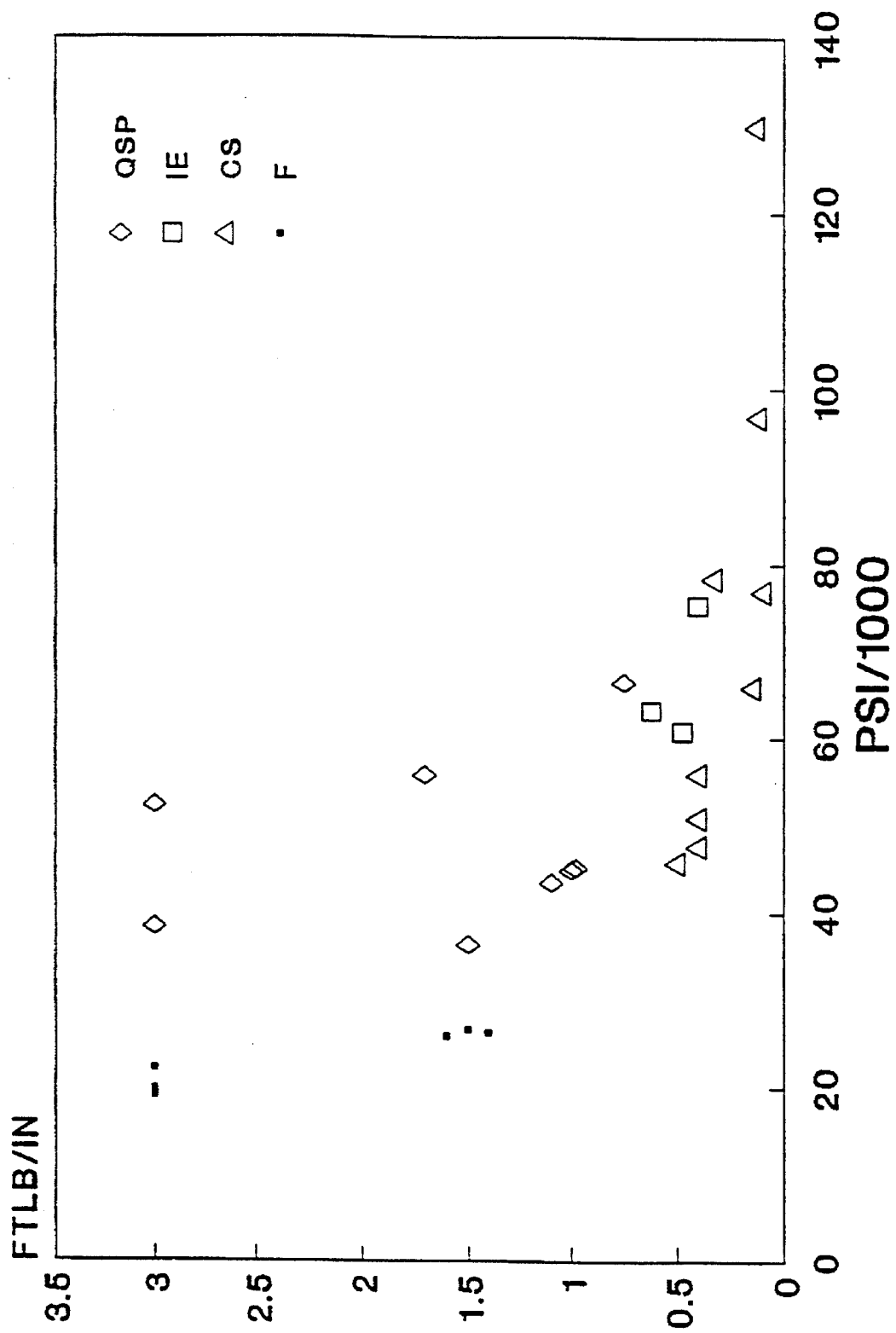
FIG. 1 is the notched Izod strength at −29° C. vs. 2° Secant modulus.
Figure 2:
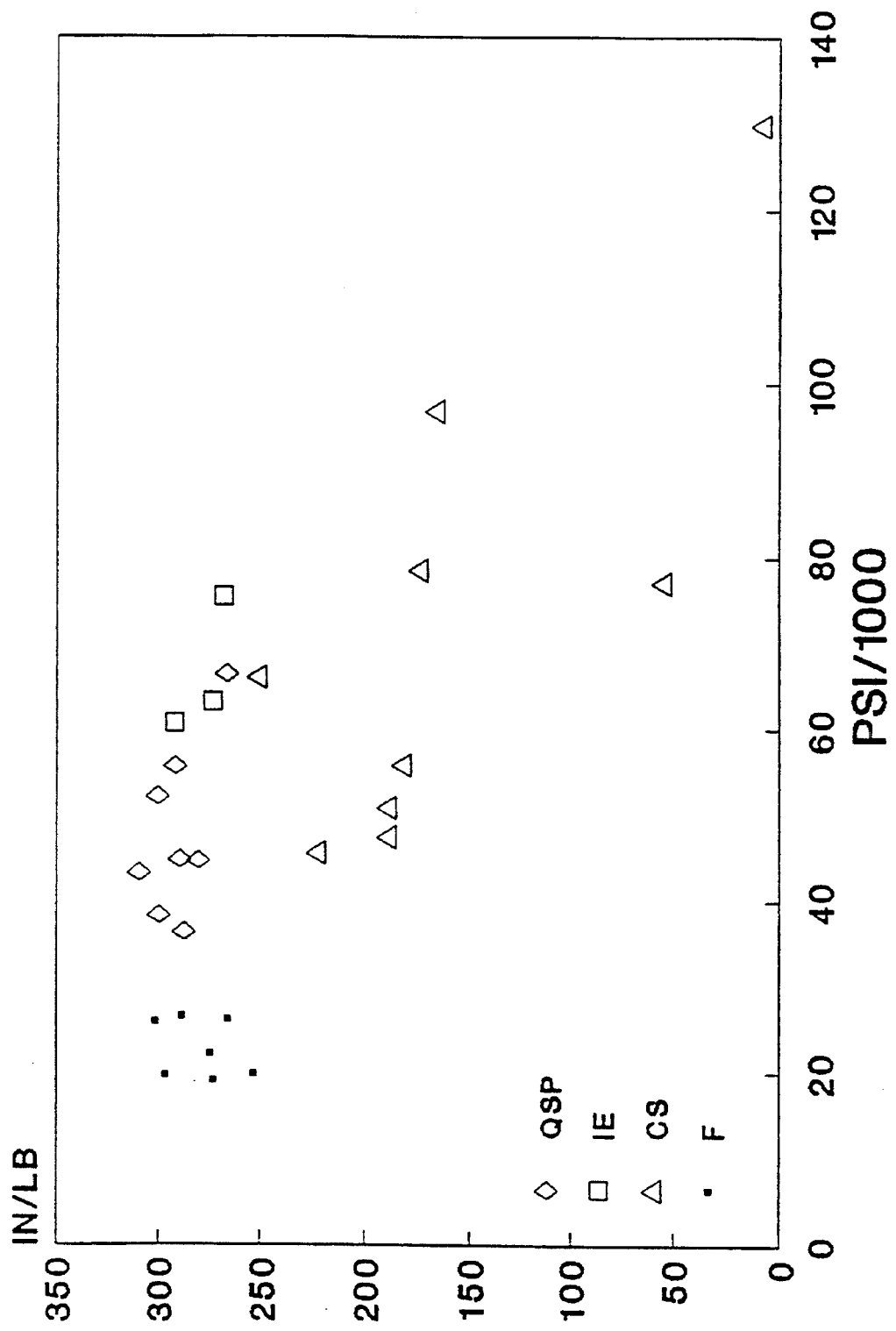
FIG. 2 is the Gardner impact strength at −29° C. vs. 2° Secant modulus.

Below is a detailed description of a preferred embodiment of the many possible embodiments that fall within this invention. Other embodiments will no doubt occur to those of ordinary skill in the art who have the benefit of reading this disclosure. It is intended that such embodiments are enclosed within the scope of this invention and embraced thereby.

This invention relates to a composition of propylene based random copolymer (RCP), polyethylene (PE) and ethylene/α-olefin rubber (ER). In particular, the composition of this invention is 25 to 45 weight percent random copolymer, preferably 25 to 35; 20 to 40 weight percent ethylene/α-olefin copolymer, preferably 30 to 40; and 30 to 45 weight percent high density polyethylene, preferably 30 to 35, based upon the total weight of the RCP, ER and PE.

The random copolymer useful in this invention is a propylene based copolymer produced by methods well known in the art that can contain up to 20 mole percent of a $C_2$ to C20 α-olefin. Examples of the α-olefin include but are not limited to, ethylene, butene, hexene, pentene, octene-1 and 4-methylpentene-1. The preferred α-olefin is ethylene. These α-olefin comonomers are present preferably at 0.1 to 10 mole percent, more preferably 3 to 7.5 mole percent.

The polyethylene useful in this invention is a high density polyethylene with a density of 0.940 g/cm$^3$ or above measured according to ASTM D1505 with an ethylene content of 98 to 100 mole %. Such HDPE is available commercially from Exxon Chemical Company under the trade name ESCORENE®.

In general, polyethylene of greater than 0.940 g/cm$^3$ is regarded as being high density polyethylene (HDPE). Low density polyethylene (LDPE) and linear low density polyethylene (LLDPE) are considered to have a density of about from 0.915 to 0.940 g/cm$^3$. Very low density polyethylene (ULDPE) is considered to have a density from 0.90 to 0.915. Ultra low density polyethylene (ULDPE) typically has a density from 0.865 to about 0.900 g/cm$^3$.

In general, the ethylene rubber useful in the invention is a substantially noncrystalline ethylene/$C_3$ to $C_{10}$ α-olefin copolymer or non-crystalline ethylene/$C_3$ to $C_{10}$ α-olefin/nonconjugated diene terpolymer. Examples of the α-olefin include propylene butene-1, pentene-1, 4-methylpentene-1, hexene-1, octene-1, with propylene being particularly preferred. The ethylene propylene rubber useful in this invention is available from Exxon Chemical under trade name Vistalon® 719 and is characterized by having an MFR of less than 1 and ethylene content of approximately 77 wt. %.

Examples of the nonconjugated diene are 1,4 hexadiene, 1,6 octadiene, cyclopentadiene, vinyl norbornene and ethylidiene norbornene with 1,4 hexadiene and ethylidiene norbornene being preferred. Non-elastomeric ethylene/α-olefin copolymer is distinguished from ethylene/α-olefin rubbers in that even if both are at the same point of the constituent monomers and density, the maximum peak temperature melting (TM) is much lower in the ethylene/alpha-olefin rubber. If the ethylene α-olefin rubber has a maximum peak melting temperature, it is typically in the range of 30° to 50° C. at most. Also ethylene α-olefin rubbers typically contain very small amounts of hexane insolubles or do not contain hexane insolubles at all. The two copolymers also differ in preparation. The ethylene/α-olefin copolymer is typically prepared using a catalyst which contains magnesium and titanium while an ethylene α-olefin rubber is usually prepared using vanadium catalyst.

The compositions of the present invention are excellent in low temperature impact resistance and appearance, among other properties. When inorganic filler is added to the composition the properties obtained, especially when vehicle exterior members are produced, are much improved not only as scratch resistance, but also in thermal resistance, paintability and rigidity. Therefore, the blends of this invention may also have fillers and additives blended into the composition to enhance their properties for their ultimate use. Inorganic fillers which may be blended in applicant's invention are exemplified by powdery or granular fillers such as calcium carbonate, calcium sulfate, calcium silicate, magnesium oxide, magnesium hydroxide, basic magnesium carbonate, magnesium calcium carbonate, aluminum hydroxide, barium carbonate, barium hydroxide, zinc carbonate, clay, diatomaceous earth, talc, alumina, siliceous sand, glass power, iron oxide, glass fiber, metallic powder, silicon carbide, silicon nitride, silica, boronitride, aluminum nitride and carbon black; flaky or scaly fillers such as mica, glass flakes, sericite, pyrophyllite, graphite, metal foils such as aluminum flakes; hollow fillers such as Shirasu balloon, metallic balloon, glass balloon, pumice; and mineral fibers such as glass fiber, carbon fiber, graphite fiber, whisker, metal fiber, silicone carbide fiber, and asbestos. Among them preferable ones are calcium carbonate, calcium silicate, magnesium hydroxide, clay, talc, silica, carbon black, mica, glass flakes, glass fiber, carbon fiber, graphite fiber and whisker and more preferable ones are calcium carbonate, talc, mica and carbon black. The addition quantities of these fillers is up to 100 pans by weight to 100 pans of the composition of the present invention. When the addition quantity of filler exceeds 100 pans by weight it is not desirable because the impact resistance of the formed product can be lowered. In the present invention, if any of the above inorganic fillers are used it is preferable that the fillers are surface treated with a fatty acid such as steric acid, oleic acid, palmitic acid, metal salts, paraffin wax, polyethylene wax or modified products or organic silane, organic borane or organic titanate.

The composition of the present invention can also include other components such as, but not limited to, thermoplastic resins; antioxidants; thermal stabilizers, (hindered phenols, phosphites, hydroquinones and thioethers); UV absorbers, (benzotriazoles, resorcinol and salicylates); dyes or pigments; flame retardants; antistatic agents; nucleating agents; lubricants; plasticizers; and release agents. Likewise two or more of these additives can be used.

The blends of this invention can be produced in a two step process. Master batches of the random copolymer and the ethylene alpha-olefin rubber are prepared under high shear to produce an intimate blend of small ER particles in a matrix of random copolymer. The dry blend is then extruded and pelletized. A Werner and Pfleiderer 50 mm twin screw extruder under conditions of minimum breakdown is adequate for this purpose.

The RCP/ER master batch pellets are then barrel tumbled with the PE pellets to produce a dry blend that is then extruded and pelletized. A 60 mm Reifenhauser single screw extruder is adequate for this purpose. The pellets produced in the second step comprise the thermoplastic olefins of this invention.

All the components of thermoplastic olefins embodied in the examples are commercial materials available from Exxon Chemical Company. The key characteristics of these materials are listed below in the following Table I.

TABLE I

| Polymer Type | Commercial Trade Designation | MFR | MI | Density (g/cm$^3$) | Ethylene wt. % |
|---|---|---|---|---|---|
| RCP | PD-9122 | 1.8–2.3 | — | — | ~2% |
| RCP | PD-9282 | 4.6–5.4 | — | — | ~5% |
| ER | Vistalon 719 | <1 | — | — | ~77% |
| HDPE | HD-6901.57 | | ~5 | 0.965 | 100% |
| LDPE | LD-103.09 | | ~1 | 0.921 | 100% |
| LLDPE | LL-3001.63 | | ~1 | 0.917 | ~96% |
| ULDPE | A-4085 | | ~3.6 | 0.88 | ~90% |

*All of the component parts are available from Exxon Chemical Company.
MFR = Melt flow rate Sample morphology was determined by scanning electron microscopy (SEM). Small blocks of the thermoplastic olefin of the invention measuring 2 mm by 2 mm by 1 mm were cut from Izod test pieces, 25 mm from end, 3 mm from the edge and 1 mm from the surface. One face of the block, parallel with the machine direction was cryomicrotomed with a fresh glass knife at −130° C. to give a microscopically smooth surface. The microtomed surface was etched with xylene at room temperature for 20 minutes in an ultrasonic bath to dissolve the exposed ER regions. Samples were degassed under vacuum for 2 hours then vacuum coated with gold for 1 minute, to lay down a coating ~100 angstroms thick. Scanning electron micrographs were recorded on an Amray 1200 SEM.

When viewed in the SEM, the regions that previously contained ethylene alpha-olefin rubber can be seen as holes. In cases where the high density polyethylene particles are encapsulated by a skin of ER to form a "core/shell" (CS) structure surrounded by a matrix of random copolymer, one of two things can happen when the ethylene propylene rubber is dissolved, the HDPE core can fall out of the hole upon removal of the ER, or the HDPE can remain trapped either by an opening too small to allow its egress or by connections to RCP matrix. When inclusions are elongated by flow during molding the morphology can take on a fibrous (F) appearance. In regions where the ER is not in a separate phase, but comingles with the HDPE on a molecular scale it will not be dissolved. In such cases the surface becomes uneven or textured. When the ER and HDPE components form a single comingled phase which is not clearly distinguished from the surrounding copolymer matrix by distinctly visible boundaries the morphology is termed "Quasi-Single Phase" (QSP). A related morphology is seen where there is only partial extraction of the ER and boundaries between the ER and HDPE are reasonably obvious this type is referred to as Incomplete Extraction (IE). The most common type of morphology reported for ternary blends in the art of propylene based random copolymer/ethylene propylene rubber and polyethylene is the core/shell morphology. Given the thermodynamic properties of the various blend components, it would not be predicted that quasi-single phase would be produced because they are immisicible.

With the development of reactor thermoplastic olefins for use in the automotive industry, it is important to understand the relationship between their morphology and properties, the key variables that control morphology should be identified. Thermoplastic polyolefins exhibit physical properties in a range that makes them useful in a wide variety of applications where toughness resiliency and moderate flexural modulus are desirable.

The scanning electron microscope reveals a spectrum of morphologies of TPO blends. At one extreme the blend with the highest concentration of random copolymer has a particulate morphology. 80% random copolymer has particulate morphology with elongated core/shell domains of HDPE and ER surrounded by a matrix of random copolymer, the other extreme is exemplified by the blends containing higher levels of ER, such as 40% ER, where quasi-single phase is observed. Quasi-single phase is defined to mean no distinct boundaries are observed. Texturing of the samples indicates that an insoluble matrix of ER and HDPE surrounds poorly defined highly elongated domains of RCP. Between the two extremes various levels of texturing and elongation of domains are displayed. Quasi-phase morphology has been found to convey an excellent balance of impact resistance combined with flexural modulus.

Two important properties of the thermoplastic olefin relevant to their use as external automotive parts are impact resistance, especially at low temperatures, and elastic modulus. Obviously parts such as bumpers and bumper covers must be reasonably elastic to recover from blows and must not shatter even at sub zero temperatures. In general, there is an inverse relationship between flexural modulus and low temperature impact resistance, one falls as the other rises. Conventionally a greater concentration of ER dispersed in a matrix of polypropylene, will show better impact resistance, but will also show a lower modulus.

Modulus is readily measured by a number of techniques, one of the most reliable being the 2° secant modulus measurement of flexural modulus. In this test a standard sample is deformed 2° from linearity, the force required being proportional to the modulus.

Low temperature impact resistance is more difficult to evaluate. Two methods are commonly used, the notched Izod test and the Gardner test. The notch Izod test involves use of a bar sample with a notch cut which is struck with a pendulum, the energy absorbed when the sample breaks gives a measure of the impact resistance. In this test, specimens that are highly impact resistant often do not break and no numerical value is available. In the accompanying figures specimens that did not break are arbitrarily assigned a value of 3 ft lb/in.

The Gardner test employs a falling weight which strikes a disk supported on an annulus. Here there is a maximum value of approximately 250 to 300 in/lb which many samples reach.

The two figures show impact resistance measured by the two methods as a function of flexural modulus. Samples have been keyed to the morphology. In both figures it can be seen that for a given impact strength, the samples with quasi-single-phase morphology have higher modulus. Similarly at a given modulus level, samples with quasi-single phase morphology show superior low temperature impact resistance to the other morphologies.

Automotive uses require a modulus in the approximate range 40,000 to 100,000 psi into which the quasi-single phase materials fall. The quasi-single phase is therefore superior to the other morphologies.

EXAMPLES

The samples listed in Table II below were produced in a two step process. The RCP and ER in the ratio listed in the table were barrel tumbled to produce a dry blend, then extruded and pelletized in Werner and Pfleiderer 57 mm twin screw extruder under conditions of minimum breakdown. The masterbatch pellets were then added to the PE pellets and barrel tumbled to produce a second dry blend. The second dry blend was then extruded and pelletized on a 60 mm Reifenhauser single screw extruder.

TABLE II

SAMPLE COMPOSITION & MORPHOLOGY

| Sample No. | RCP type | PE type | RCP (%) | ER (%) | PE (%) | Morphology |
|---|---|---|---|---|---|---|
| 1 | PD-9282 | HDPE | 25 | 40 | 35 | QSP |
| 2 | PD-9282 | HDPE | 35 | 40 | 25 | QSP |
| 3 | PD-9282 | HDPE | 35 | 30 | 35 | QSP |
| 4 | PD-9282 | HDPE | 35 | 20 | 45 | IE |
| 5 | PD-9282 | HDPE | 45 | 20 | 35 | IE |
| 6 | PD-9282 | HDPE | 60 | 15 | 25 | CS |
| 7 | PD-9282 | HDPE | 80 | 5 | 15 | CS |
| 8 | PD-9122 | HDPE | 25 | 40 | 35 | QSP |
| 9 | PD-9122 | HDPE | 35 | 40 | 25 | QSP |
| 10 | PD-9122 | HDPE | 35 | 30 | 35 | QSP |
| 11 | PD-9122 | HDPE | 35 | 20 | 45 | IE |
| 12 | PD-9122 | HDPE | 45 | 20 | 35 | CS |
| 13 | PD-9122 | HDPE | 60 | 15 | 25 | CS |
| 14 | PD-9122 | HDPE | 80 | 5 | 15 | CS |
| 15 | PD-9282 | HDPE | 35 | 30 | 35 | QSP |
| 16 | PD-9282 | HDPE | 35 | 60 | 5 | F |
| 17 | PD-9282 | HDPE | 35 | 30 | 35 | QSP |
| 18 | PD-9282 | HDPE | 80 | 15 | 5 | CS |
| 19 | PD-9282 | LDPE | 35 | 60 | 5 | F |
| 20 | PD-9282 | LDPE | 35 | 30 | 35 | F |
| 21 | PD-9282 | LDPE | 80 | 15 | 5 | CS |
| 22 | PD-9282 | LLDPE | 35 | 60 | 5 | F |
| 23 | PD-9282 | LLDPE | 35 | 30 | 35 | F |
| 24 | PD-9282 | LLDPE | 80 | 15 | 5 | CS |
| 25 | PD-9282 | VLDPE | 35 | 60 | 5 | F |
| 26 | PD-9282 | VLDPE | 35 | 30 | 35 | F |
| 27 | PD-9282 | VLDPE | 80 | 15 | 5 | CS |

QSP = Quasi Single Phase
F = Fibrous
CS = Core/Shell
EE = Incomplete Extraction

Tables III and IV report the testing data for the above samples using regiments described by ASTM. When LDPE, LLDPE, and VLDPE were used in the blends of this invention, quasi-single phase morphology was not observed.

TABLE III

Physical Properties of Single Gated Injection Molded TPO's

| Sample # | Melt Flow Rate (g/10 min) | Yield Stress (psi) | Yield Elongation (%) | Secant Modulus (psi) | Flexural Strength (psi) | Notched Izod @ 23° C. (ft-lb/in) | Notched Izod @ −29° C. (ft-lb/in) | Gardner Impact Strength (in/lb) | Density (g/cm³) | Brittleness Temperature (°C.) | Shore Hardness (Type D2) |
|---|---|---|---|---|---|---|---|---|---|---|---|
| 1 | 2.09 | 1810 | 22.7 | 38249 | 891 | NB | NB | 299 | 0.9111 | <−58 | 46.0 |
| 2 | 1.95 | 1779 | 27.6 | 36221 | 849 | NB | 1.50 | 287 | 0.9057 | <−59 | 45.0 |
| 3 | 2.89 | 2160 | 21.7 | 44921 | 1050 | NB | 0.98 | 289 | 0.9134 | <−62 | 48.0 |
| 4 | 4.55 | 2632 | 19.5 | 63066 | 1455 | NB | 0.62 | 272 | 0.9176 | <−59 | 52.5 |
| 5 | 4.15 | 2624 | 20.5 | 60645 | 1408 | NB | 0.47 | 291 | 0.9128 | <−59 | 52.0 |
| 6 | 4.86 | 2841 | 20.9 | 65897 | 1532 | NB | 0.10 | 250 | 0.9080 | <−59 | 53.5 |
| 7 | 6.75 | 3185 | 21.6 | 76930 | 1788 | PB | 0.10 | 54 | 0.9030 | −35 | 56.0 |
| 8 | 2.03 | 2174 | 21.8 | 52124 | 1210 | NB | NB | 300 | 0.9154 | <−66 | 49.0 |
| 9 | 1.59 | 2250 | 23.7 | 55592 | 1297 | NB | 1.70 | 291 | 0.9094 | <−63 | 49.5 |
| 10 | 4.36 | 2658 | 19.6 | 66354 | 1536 | NB | 0.75 | 266 | 0.9161 | <−62 | 52.5 |
| 11 | 9.15 | 3055 | 17.4 | 75288 | 1738 | PB | 0.40 | 267 | 0.9232 | <−58 | 52.5 |
| 12 | 7.18 | 3231 | 17.9 | 78363 | 1790 | PB | 0.33 | 173 | 0.9178 | −56 | 56.5 |
| 13 | 6.40 | 3675 | 17.5 | 96661 | 2227 | 0.6 | 0.12 | 165 | 0.9134 | −26 | 59.0 |
| 14 | 4.40 | 4473 | 16.1 | 129680 | 2986 | 0.6 | 0.13 | <8 | 0.9083 | −16 | 63.0 |
| 15 | 2.89 | 2120 | 21.8 | 43354 | 1014 | NB | 1.10 | 309 | 0.9126 | <−66 | 48.0 |

NB = No break
PB = Partial break

TABLE IV

| | | | | | Physical Properties of Single Gated Injection Molded TPO's | | | | | | |
|---|---|---|---|---|---|---|---|---|---|---|---|
| Sample # | Melt Flow Rate (g/10 min) | Yield Stress (psi) | Yield Elongation (%) | Secant Modulus (psi) | Flexural Strength (psi) | Notched Izod @ 23° C. (ft-lb/in) | Notched Izod @ -29° C. (ft-lb/in) | Gardner Impact Strength (in/lb) | Density (g/cm³) | Brittleness Temperature (°C.) | Shore Hardness (Type D2) |
| 16 | 1.81 | 1151 | 40.7 | 22165 | 543 | NB | NB | 274 | 0.8930 | <-57 | 36 |
| 17 | 3.78 | 2091 | 23.2 | 44702 | 1070 | NB | 1.0 | 280 | 0.9127 | <-57 | 49 |
| 18 | 6.47 | 2486 | 25.6 | 55723 | 1335 | 2.50 | 0.4 | 181 | 0.8940 | -43 | 54 |
| 19 | 1.20 | 1308 | 61.7 | 19761 | 482 | NB | NB | 253 | 0.8912 | <-58 | 35 |
| 20 | 1.58 | 1555 | 49.8 | 26208 | 628 | NB | 1.4 | 265 | 0.9011 | <-57 | 43 |
| 21 | 5.93 | 2388 | 25.0 | 50785 | 1208 | 2.16 | 0.4 | 188 | 0.8916 | -46 | 54 |
| 22 | 1.51 | 1105 | 46.8 | 19045 | 468 | NB | NB | 272 | 0.8912 | <-57 | 34 |
| 23 | 2.06 | 1454 | 37.9 | 26556 | 644 | NB | 1.5 | 288 | 0.9002 | <-57 | 42 |
| 24 | 6.36 | 2294 | 26.3 | 47513 | 1147 | 3.30 | 0.4 | 188 | 0.8926 | -4 | 53 |
| 25 | 1.62 | 1097 | 47.4 | 19673 | 480 | NB | NB | 296 | 0.8895 | <-62 | 35 |
| 26 | 3.88 | 1374 | 37.5 | 25832 | 625 | NB | 1.6 | 301 | 0.8896 | <-58 | 40 |
| 27 | 6.67 | 2152 | 27.9 | 45648 | 1086 | NB | 0.5 | 222 | 0.8907 | -45 | 51 |

NB = No break
PB = Partial break

In general low temperature impact properties of TPOs improve as the proportion of the rubber increases, however, as the impact properties improve there is a corresponding loss of stiffness. This tradeoff of desirable properties could be a limiting factor in some applications. In general when a rubber phase is added to polypropylene or random copolymer the impact strength increases at the expense of modulus. This trend is basically followed by the thermoplastic olefins in the art. However, there is a notable departure from this trend when the quasi-single phase of the invention is obtained. Quasi-single phase examples exhibit high impact strength typical of fibrous morphology. The quasi-single phase exhibits a brittleness temperature of less than about -57° C. and has a modulus only slightly lower than that with samples of core/shell morphology.

Injection molded model TPOs exhibit three main morphologies which are directly rated to their mechanical properties. Fibrous morphology generally have good low temperature impact resistance, but poor modulus. Particulate morphologies exhibit good modulus, but poor impact resistance. The quasi- single phase morphology exhibits good low temperature impact resistance and respectable modulus values. The morphology is controlled by the composition and molding conditions of the samples.

The fibrous morphology has a brittleness temperature of less than -57° C., a Gardner impact strength of greater than 250 ft/lb/in and 2° Secant modulus of less than 27,000 psi.

Samples with a particulate morphology have brittleness temperatures of -42 to -46° C., a Gardner impact strength of 180 to 230 ft lb/in and 2° Secant modulus of 45,000 to 56,000 psi. Thus quasi-single phase exhibits desirable qualities of both fibrous and particulate morphology types with a brittleness temperature of less than -57° C., a Gardner strength of about 280 ft lb/in and greater, and a 2° Secant modulus above about 40,000 psi (particularly those above 45,000 psi). Thus the impact strength and modulus, which are two of the key attributes identified above, may be optimized by obtaining quasi-single phase morphology.

As apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention by limited thereby.

I claim:

1. A blend comprising:
   a. from 25 wt. % to 45 wt. % of a random propylene copolymer containing from 0.1 to 10 mole percent of an α-olefin comonomer;
   b. from 20 wt. % to 40 wt. % of a non-crystalline or substantially non-crystalline ethylene/α-olefin elastomer, said elastomer optionally comprising a diene termonomer; and
   c. from greater than 30 wt. % to 45 wt. % of a polyethylene having a density of at least 0.94 g/cm³;
   wherein each wt. % is based upon the total weight of said blend.

2. A process for producing a polymeric blend exhibiting quasi-single-phase or incomplete extraction morphologies, said process comprising blending: 20 wt. % to 40 wt. % of a non-crystalline or substantially non-crystalline ethylene/α-olefin elastomer; from 25 wt. % to 45 wt. % of a random copolymer of propylene containing up to 10 mole percent of an α-olefin; and from greater than 30 wt. % to 45 wt. % of a polyethylene having a density of 0.94 g/cm³ or above, wherein each wt. % is based upon the total weight of said blend.

3. A blend consisting essentially of:
   a. from 25 wt. % to 45 wt. % of a random propylene copolymer with 0.1 to 10 mole percent of an α-olefin comonomer;
   b. from 20 wt. % to less than 30 wt. % of a non crystalline or substantially noncrystalline ethylene/α-olefin elastomer, said elastomer optionally comprising a diene termonomer; and
   c. from greater than 30 wt. % to 45 wt. % of a polyethylene having a density of at least 0.94 g/cm³, each wt. % based upon the weight of the blend.

4. A blend comprising:
   a. from 25 wt. % to 45 wt. % of a random propylene copolymer with 0.1 to 10 mole percent of an α-olefin comonomer;
   b. from 20 wt. % to 40 wt. % of a non-crystalline or substantially non-crystalline ethylene/α-olefin elastomer, said elastomer optionally comprising a diene termonomer; and c. from 35 wt. % to 45 wt. % polyethylene having a density of at least 0.94 g/cm³; each wt. % based upon the total weight of said blend.

5. A composition comprising the blend of claim 1 and a filler wherein the filler may be present in an amount of up to 100 parts by weight filler per 100 pans by weight of the blend.

6. The blend of claim 1 wherein said blend is free of polyethylene having a density of 0.915 g/cm³ and below.

7. An article comprising the blend of claim 6.

8. The blend of claim 1, wherein the propylene copolymer is present in the range of from 25 wt. % to 35 wt. % of the blend.

9. The blend of claim 1, wherein the ethylene/α-olefin is present in the range of from 30 wt. % to 40 wt. % of the blend.

10. The blend of claim 1, wherein the polyethylene is present in the range of from more than 30 wt. % to 35 wt. % of the blend.

11. The blend of claim 1, wherein the α-olefin comonomer of the random propylene copolymer is ethylene.

12. The blend of claim 1, wherein the α-olefin comonomer of the ethylene α-olefin elastomer is propylene.

13. The blend of claim 1, molded into a bumper, automotive facia, interior trim, exterior trim, weather trim, hose, vehicle exterior pan, wheel arch, air dam, storage container, or trash can.

14. The blend of claim 6 further comprising a filler in an amount of up to 100 parts by weight filler per 100 parts by weight of the blend.

15. The blend of claim 1 wherein the ethylene/α-olefin elastomer has an ethylene content of about 77 weight percent or less.

16. The blend of claim 1 wherein the ethylene/α-olefin elastomer either has a maximum peak melting temperature of 50° C. or less or has no maximum peak melting temperature.

17. The process of claim 2 wherein said polyethylene is blended in an amount ranging from 35 to 45 weight percent of the total weight of the blend and has a density of 0.94 g/cm³ or above.

\* \* \* \* \*

UNITED STATES PATENT AND TRADEMARK OFFICE
CERTIFICATE OF CORRECTION

PATENT NO. : 5,502,112
DATED : March 26, 1996
INVENTOR(S) : Andrew J. Peacock

It is certified that error appears in the above-indentified patent and that said Letters Patent is hereby corrected as shown below:

Title Page, First Column: After "Notice:" replace the year "2094" with the year --2012--.

Column 2, Line 31: Replace the word "an" with the word --art--

Column 3, Line 38: Replace the parenthetic abbreviation "(ULDPE)" with the abbreviation --(VLDPE)--

Column 4, Line 31: Replace the word "pans" in both occurrences with the word --parts--

Column 4, Line 33: Replace the word "pans" with the word --parts--
Column 11,
Claim 5, Line 3: Replace the word "pans" with the word --parts--

Signed and Sealed this

Twelfth Day of November, 1996

Attest:

BRUCE LEHMAN

*Attesting Officer*     *Commissioner of Patents and Trademarks*